(12) United States Patent
Hanks

(10) Patent No.: US 6,721,260 B2
(45) Date of Patent: Apr. 13, 2004

(54) ELECTROMAGNETICALLY CONTROLLED DRIVE SYSTEM AND METHOD

(75) Inventor: Darwin Mitchell Hanks, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 324 days.

(21) Appl. No.: 09/946,027

(22) Filed: Sep. 4, 2001

(65) Prior Publication Data

US 2003/0043725 A1 Mar. 6, 2003

(51) Int. Cl.$^7$ ................................................. G11B 7/00
(52) U.S. Cl. ........................ 369/112.29; 369/112.21; 369/44.22
(58) Field of Search .......................... 369/44.11, 44.14, 369/44.15, 44.22, 44.27, 112.01, 112.21, 112.29

(56) References Cited

U.S. PATENT DOCUMENTS

| 4,862,441 | A | * | 8/1989 | Yumura et al. | ........... 369/44.15 |
| 5,130,972 | A | * | 7/1992 | Mizuno et al. | ............. 369/215 |
| 5,150,343 | A | * | 9/1992 | Goto et al. | ............. 369/44.22 |
| 5,532,997 | A | * | 7/1996 | Pauli | ..................... 369/112.29 |

* cited by examiner

Primary Examiner—Muhammad Edun

(57) ABSTRACT

An electromagnetically controlled drive system for accessing a data storage medium comprises an optical signal generator and a reflector element adapted to receive an optical signal from the optical signal generator. The reflector element is also adapted to direct the optical signal toward the data storage medium. The system also comprises an electromagnetic element adapted to generate an electromagnetic field proximate to the reflector element. The reflector element is adapted to respond to the electromagnetic field to move the optical signal relative to the data storage medium in response to a change in the electromagnetic field.

20 Claims, 3 Drawing Sheets

ELECTROMAGNETICALLY CONTROLLED DRIVE SYSTEM AND METHOD

TECHNICAL FIELD OF THE INVENTION

The present invention relates generally to the field of data reading/writing drive systems and, more particularly, to an electromagnetically controlled drive system and method.

BACKGROUND OF THE INVENTION

Optical media, eg., compact discs (CDs), digital video discs (DVDs), and smart cards, have become the standard media for storing and distributing large quantities of information in a relatively small and compact package. The mechanism or drive system for reading data from, or writing data to, these types of data storage media, however, generally requires several different actuators and motors. For example, in rotating media applications, the following motors and actuators are generally required: 1) a spindle motor to rotate the media; 2) a sled motor to move an optical head across or along tracks of the media: 3) a loading motor for receiving and properly mounting the media on a spindle; 4) a tilt motor for adjusting an angle of the media or the optical head relative to each other; and 5) focus and tracking actuators for media tracking adjustments. Accordingly, the cost, power dissipation, and potential for mechanical malfunction associated with conventional drive systems may be significant.

SUMMARY OF THE INVENTION

In accordance with one embodiment of the present invention, an electromagnetically controlled drive system for accessing a data storage medium comprises an optical signal generator and a reflector element adapted to receive an optical signal from the optical signal generator. The reflector element is also adapted to direct the optical signal toward the data storage medium. The system also comprises an electromagnetic element adapted to generate an electromagnetic field proximate to the reflector element. The reflector element is adapted to respond to the electromagnetic field to move the optical signal relative to the data storage medium in response to a change in the electromagnetic field.

In accordance with another embodiment of the present invention, a method for accessing a data storage medium comprises directing an optical signal toward the data storage medium via a reflector element. The method also comprises generating an electromagnetic field proximate to the reflector element. The reflector element is adapted to respond to the electromagnetic field to move the optical signal relative to the data storage medium in response to a change in the electromagnetic field.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Embodiments of the present invention and the advantages thereof are best understood by referring to FIGS. 1 through 7 of the drawings, like numerals being used for like and corresponding parts of the various drawings.

Figure 1:
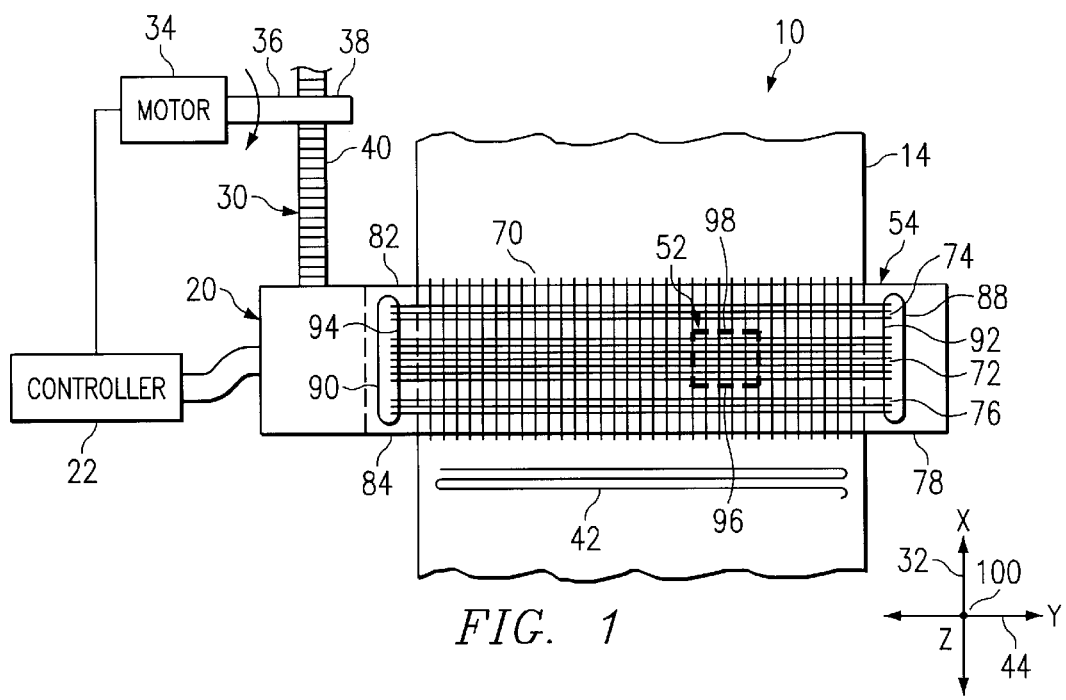
FIG. 1 is a diagram illustrating a top plan view of an electromagnetically controlled drive system in accordance with an embodiment of the present invention.
Figure 2:
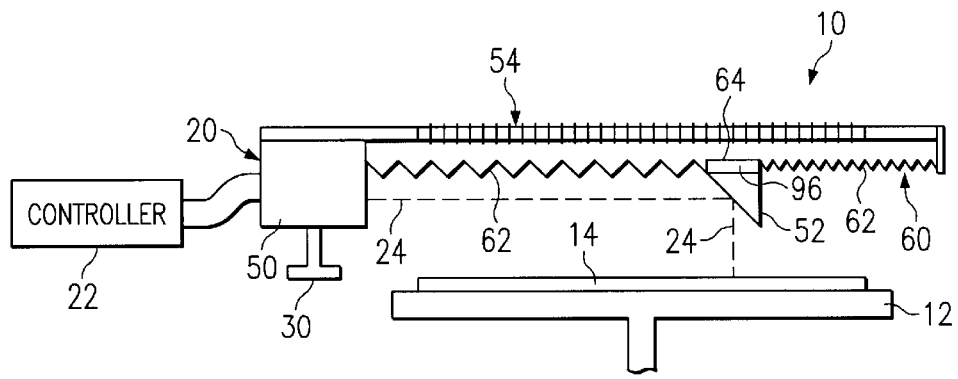
FIG. 2 is a diagram illustrating a side view of the system illustrated in FIG. 1 in accordance with an embodiment of the present invention.

FIG. 1 is a diagram illustrating a top plan view of an electromagnetically controlled drive system 10 in accordance with an embodiment of the present invention, and FIG. 2 is a diagram illustrating a side view of the system 10 illustrated in FIG. 1 in accordance with an embodiment of the present invention. The system 10 includes a support 12 adapted to receive and support a data storage medium 14. In the illustrated embodiment, the data storage medium 14 comprises a smart card-type storage medium; however, it should be understood that other types of data storage mediums may be used with the present invention including, but not limited to, CDs and DVDs. Further, the embodiment illustrated in FIGS. 1 and 2 contemplates the use of optical signals for accessing optical-type data storage media; however, other types of non-optical data storage mediums and associated signal types may be used in accordance with the teachings of the present invention, including, but not limited to, magnetic tape data storage media.

In the illustrated embodiment, the system 10 also comprises a read/write system 20 and a controller 22. Briefly, the read/write system 20 generates an optical signal 24 and directs the optical signal 24 toward the data storage medium 14 to enable reading from, writing to, and/or erasing data from the data storage medium 14. The controller 22 controls the position of the read/write system 20, and thereby controlling the position of the optical signal 24 relative to the data storage medium 14. The controller 22 is also used to generate an electromagnetic field such that changes in the electromagnetic field are used to modify or move the position of the optical signal 24 relative to the data storage medium 14.

In the illustrated embodiment, the read/write system 20 is coupled to a carriage 30 to provide movement of the read/write system 20 in a direction corresponding to the X-axis 32. For example, in the illustrated embodiment, the carriage 30 comprises a motor 34 having a rotatable drive shaft 36. The drive shaft 36 includes a pinion 38 adapted to engage a corresponding rack 40 coupled to the read/write system 20. The controller 22 is coupled to the motor 34 for transmitting control signals to the motor 34 to control rotational output provided to the drive shaft 36 by the motor 34. Rotational movement of the drive shaft 36 causes corresponding movement of the read/write system 20 along the X-axis 32 via the rack 40 and pinion 38 interface. However, it should be understood that worm gear systems, belt drive systems, or other suitable drive systems may be used to transport the read/write system 20 along the X-axis 32.

In the illustrated embodiment, the data storage medium 14 is oriented relative to the read/write system 20 such that a data track 42 of the data storage medium 14 is disposed primarily along a Y-axis 44, thereby resulting in tracking position control of the read/write system 20 along the X-axis 32 and sweep control of the read/write system 20 along the Y-axis 44. However, it should be understood that the orientation of the data storage medium 14 and the read/write system 20 relative to each other may be otherwise modified to provide movement of the read/write system 20 relative to the data storage medium 14 in the required directions.

In the embodiment illustrated in FIGS. 1 and 2, the read/write system 20 comprises a generator element 50, a reflector element 52, and an electromagnetic element 54. The generator element 50 includes optical components and corresponding electronics associated with generating, transmitting, receiving, and detecting the optical signals 24 relative to the data storage medium 14. For example, the generator element 50 may include a laser, columnar lens, deflector, detector, quarter-wave plate, beam splitter, and other optical elements and associated electronic devices (not explicitly shown) associated with the optical signal 24 communication relative to the data storage medium 14.

The reflector element 52 is disposed in a spaced apart relationship relative to the generator element 50 and is configured to receive the optical signal 24 from the generator element 50 and direct the optical signal 24 between the generator element 50 and the data storage medium 14. For example, the reflector element 52 may include a mirror, an objective lens, and other associated optical devices (not explicitly shown) for receiving and directing the optical signal 24 between the generator element 50 and the data storage medium 14. In the illustrated embodiment, a support system 60 is coupled to the reflector element 52 to movably suspend the reflector element 52 proximate to the data storage medium 14. In this embodiment, the support system 60 comprises a plurality of springs 62 each coupled to the reflector element 52 to provide flexible movement of the reflector element 52 relative to the data storage medium 14 and suspend the reflector element 52 upwardly relative to the data storage medium. However, it should be understood that other suitable systems and devices may be used to movably suspend the reflector element 52 proximate to the data storage medium 14.

The reflector element 52 is also adapted to be responsive to the electromagnetic field generated by the controller 22, thereby providing movement of the reflector element 52 relative to the data storage medium 14 in response to changes in the generated electromagnetic field. For example, in the illustrated embodiment, the reflector element 52 comprises a magnet 64 disposed upwardly toward the electromagnetic element 54. Briefly, the forces generated by the magnetic field of the magnet 64 interact with the forces associated with the electromagnetic field generated by the controller 22, thereby resulting in attracting and repelling forces between the corresponding magnetic and electromagnetic fields. Thus, changes in the generated electromagnetic field provide movement of the reflector element 52 relative to the data storage medium 14.

The electromagnetic element 54 of the read/write system 20 is disposed proximate to the reflector element 52 and comprises conductive coils 70, 72, 74, and 76 for generating an electromagnetic field proximate to the reflector element 52. For example, in the illustrated embodiment, the coils 70, 72, 74, and 76 may comprise conductive wires spirally wound about a support member 78, thereby forming a generally flattened-shaped coil. However, it should be understood that the coils 70, 72, 74, and 76 may be otherwise wound and supported proximate to the reflector element 52. The conductive wires used to form the coils 70, 72, 74, and 76 may also include a protective coating to avoid shorting between each of the coils 70, 72, 74, and 76. Thus, according to the illustrated embodiment, the electromagnetic element 54 functions as an electromagnetic stator and the reflector element 52 functions as a rotor.

As best illustrated in FIG. 1, the coil 70 is spirally wound about the support member 78 in a direction corresponding substantially along the X-axis 32, thereby forming the coil 70 extending substantially along the Y-axis 44. However, the wire direction of the coil 70 may also be disposed at a slight angle relative to the X-axis 32 to accommodate winding formation of the coil 70. For example, the edges 82 and 84 of the support member 78 may be disposed at a nonorthogonal angle relative to the X-axis 32, thereby resulting in substantial alignment of the wiring direction relative to the X-axis 32. As illustrated in FIG. 1, the coil 70 extends along the Y-axis 44 a sufficient distance relative to the data storage medium 14 to provide movement of the reflector element 52 along the Y-axis 44 to control sweep movement of the reflector element 52 along the track 42. For example, the coil 70 may extend slightly beyond a width of the data storage medium 14 extending along the Y-axis 44 to accommodate full access to the data stored on the data storage medium 14.

The coils 72, 74, and 76 are formed by spirally winding the conductive wire in a direction substantially corresponding to the Y-axis 44 about the support member 78 via openings 88 and 90 of the support member 78, thereby resulting in the coils 72, 74, and 76 extending substantially along the X-axis 32. As described above, the wire direction of the coils 72, 74, and 76 may be disposed at a slight angle relative to the Y-axis 44 to accommodate winding about the support member 78. However, it should be understood that the wiring direction may also be disposed in substantial alignment with the Y-axis 44, for example, by disposing edges 92 and 94 at a nonorthogonal angle relative to the Y-axis 44.

As illustrated in FIG. 1, the coil 72 is medially disposed relative to the edges 82 and 84 of the support member 78, thereby disposing the coil 72 directly upwardly relative to the reflector element 52. As will be described in greater detail below, the coil 72 is disposed within the boundaries of the magnet 64 formed by edges 96 and 98 of the magnet 64 to provide movement of the reflector element 52 along the X-axis 32 for fine tune tracking of the optical signal 24 relative to the track 42. The coils 74 and 76 are disposed adjacent to and spaced apart from the coil 72, thereby resulting in a position of the coils 74 and 76 outside the boundaries of the magnet 64 formed by the edges 96 and 98. As will be described in greater detail below, the position of the coils 74 and 76 relative to the magnet 64 provides movement of the reflector element 52 in a direction substantially orthogonal to the X-axis 32 and Y-axis 44 along a Z-axis, indicated generally at 100 and extending into and out of the page, thereby providing tilt and focus of the reflector element 52 relative to the data storage medium 14.

Figure 3:
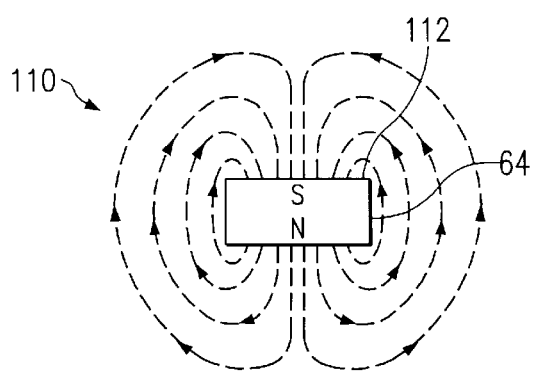
FIG. 3 is a diagram illustrating a magnetic field associated with an element of the system illustrated in FIGS. 1 and 2 in accordance with an embodiment of the present invention.

In operation, the controller 22 is coupled to the read/write system 20 to generate currents through the coils 70, 72, 74, and 76 for generating an electromagnetic field proximate to the magnet 64. For example, the controller 22 may selectively energize and de-energize the coils 70, 72, 74, and 76, as well as vary current direction and current amplitude, to produce varying electromagnetic field forces proximate to the reflector element 52. Referring briefly to FIG. 3, there is shown a diagram illustrating a magnetic field 110 associated with the magnet 64 of the reflector element 52. As illustrated in FIG. 3, the magnetic field 110 generated by the magnet 64 corresponding to the north and south poles of the magnet 64 result in varying directional forces relative to the magnet 64. The forces generated by the magnetic field 110 interact with the forces generated by the electromagnetic field associated with the coils 70, 72, 74, and 76 to provide movement of the reflector element 52 relative to the data storage medium 14.

Referring to FIG. 1, the controller 22 generates a current through the coil 70 to provide tracking movement of the reflector element 52 substantially along the Y-axis 44. For example, applying the right-hand rule, a current direction through the coil 70 substantially along the X-axis 32 combined with the forces caused by the magnetic field 110 of the magnet 64 results in forces applied to the reflector element 52 substantially along the Y-axis 44. The controller 22 also generates a current through the coil 72 to provide fine tune tracking of the reflector element 52 substantially along the X-axis 32. For example, applying the right-hand rule, the current direction through the coil 72 substantially along the Y-axis 44 combined with the forces generated by the magnetic field 110 located upwardly from a face 112 of the magnet 64 results in forces applied to the reflector element 52 substantially along the X-axis 32. The controller 22 also generates a current through the coils 74 and 76 to provide movement of the reflector element 52 substantially along the Z-axis 100 for focus and tilt of the optical signal 24 relative to the data storage medium 14. For example, applying the right-hand rule, the current direction through the coils 74 and 76 substantially along the Y-axis 44 combined with the forces generated by the magnetic field 110 disposed adjacent the boundaries of the magnet 64 formed by the edges 96 and 98 of the magnet 64 results in forces acting on the reflector element 52 substantially along the Z-axis 100. Accordingly, disposing the coils 74 and 76 on each side of the magnet 64 may also produce rotational movement of the reflector element 52 about the Y-axis 44.

Thus, the present invention generates an electromagnetic field to control multi-directional movement of the element 52 relative to the data storage medium 14 to provide reading/writing/erasing of data associated with the data storage medium 14. For example, the electromagnetic field is used to control movement of the element 52 relative to the data storage medium 14 laterally along the X-axis 32 and Y-axis 44 as well as vertically along the Z-axis 100. The present invention generates the electromagnetic field to also control rotation of the element 52 relative to the data storage medium 14. Accordingly, the present invention substantially reduces the costs and power consumption associated with prior drive systems by substantially reducing the quantity of motors and actuators required for positional control of the optical signal 24 relative to the data storage medium 14.

As described above, the present invention may also be used in non-optical applications. For example, in a magnetic-type or other type of data storage medium 14 application, the element 52 may be coupled to the element 50 via wires or other suitable devices for transmitting signals between the elements 50 and 52. The element 52 may comprise a device configured for accessing or writing data to the particular type of storage medium 14. The electromagnetic field may be used to control multidirectional movement of the element 52 relative to the data storage medium 14.

Figure 4:
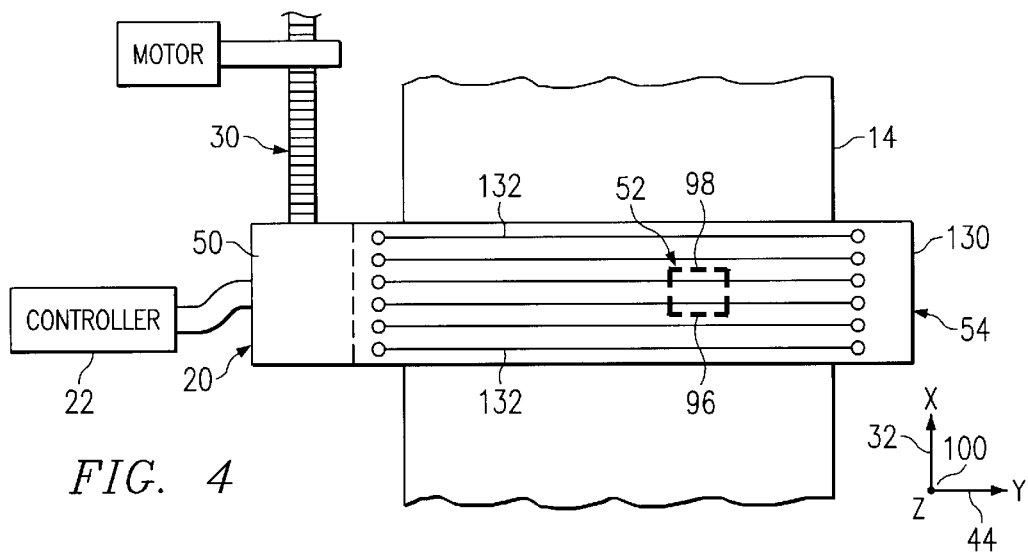
FIG. 4 is a diagram illustrating a top plan view of an electromagnetically controlled drive system in accordance with another embodiment of the present invention.
Figure 5:
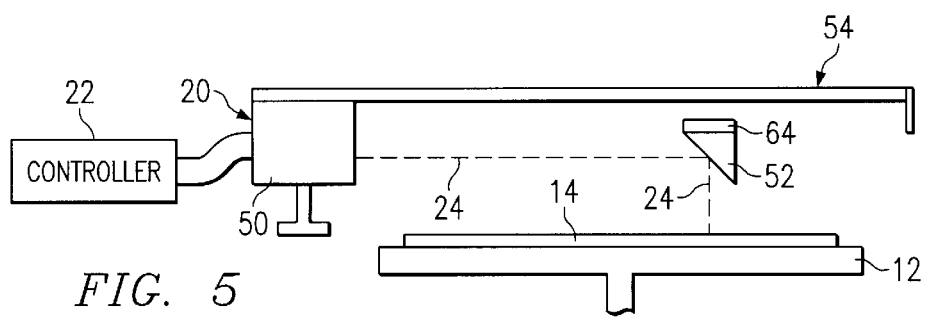
FIG. 5 is a diagram illustrating a side view of the system illustrated in FIG. 4 in accordance with an embodiment of the present invention.

FIG. 4 is a diagram illustrating a top plan view of the system 10 in accordance with another embodiment of the present invention, and FIG. 5 is a diagram illustrating a side view of the system 10 illustrated in FIG. 4 in accordance with another embodiment of the present invention. In this embodiment, the electromagnetic element 54 comprises a printed circuit board 130 disposed proximate to the reflector element 52. As will be described in greater detail in connection with FIG. 6, the coils corresponding to the electromagnetic element 54 of the read/write system 20 are formed by conductive traces 132 formed on the printed circuit board 130. Additionally, in this embodiment, the reflector element 52 is suspended upwardly relative to the data storage medium 14 via the electromagnetic field generated by the controller 22, thereby alleviating a requirement of the support system 60. For example, current directions and amplitudes may be varied and controlled to produce electromagnetic field forces interacting with the forces associated with the magnetic field 110 of the magnet 64 to movably suspend the reflector element 52 proximate to the data storage medium 14.

Figure 6:
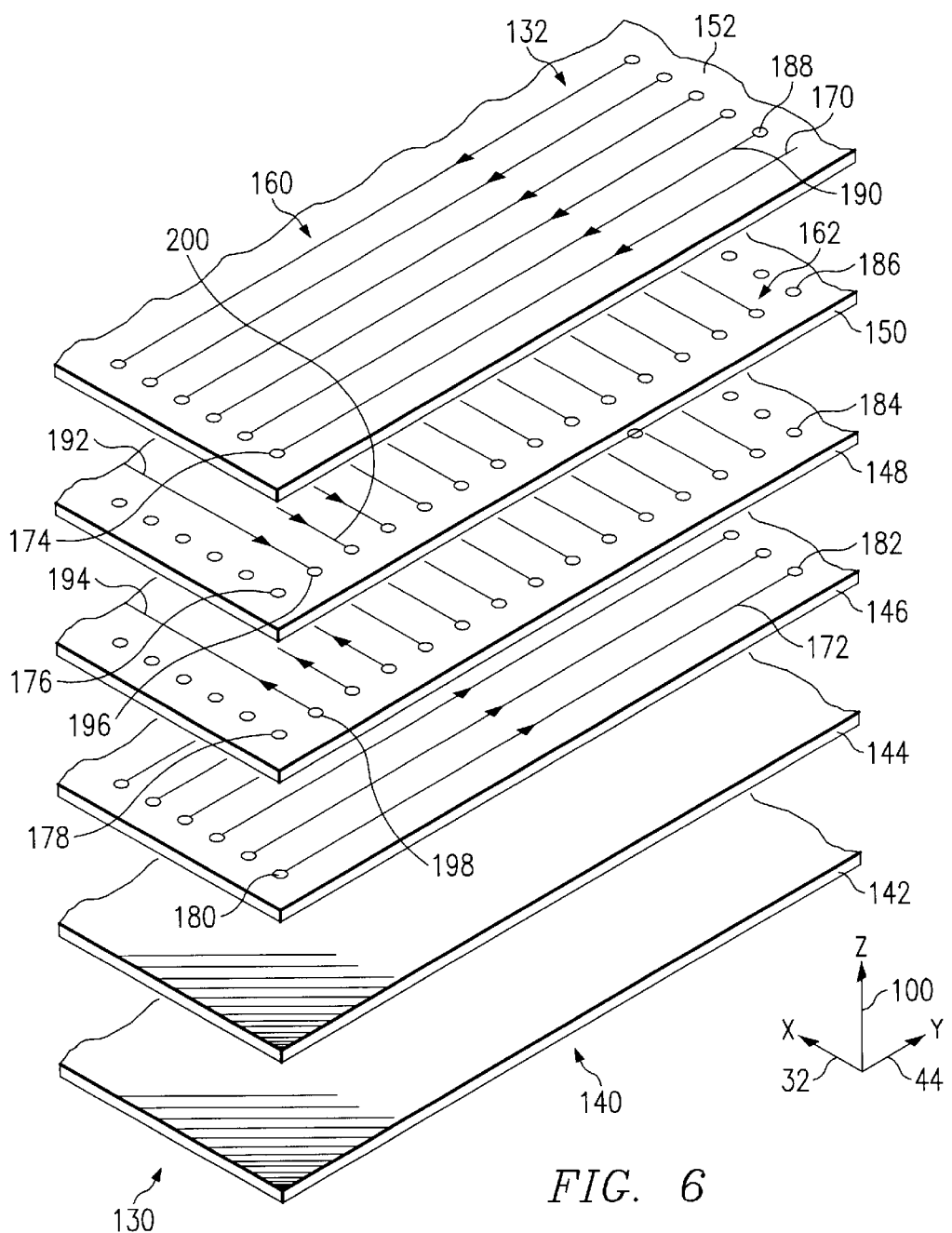
FIG. 6 is a diagram illustrating an electromagnetic stator of the system illustrated in FIGS. 4 and 5 in accordance with an embodiment of the present invention.

FIG. 6 is a diagram illustrating the electromagnetic element 54 illustrated in FIGS. 4 and 5 in accordance with an embodiment of the present invention. In this embodiment, the printed circuit board 130 comprises a multi-layer printed circuit board 140 formed of layers 142, 144, 146, 148, 150, and 152. In the illustrated embodiment, the multi-layer printed circuit board 140 comprises six layers; however, it should be understood that the quantity of layers may be otherwise increased or decreased to accommodate various coil formation quantities and properties and electromagnetic field generation applications. Additionally, it should be understood that the multi-layer printed circuit board 140 may also be replaced by one or more discrete single-layer printed circuit boards each having one or more coil formations disposed thereon and disposed proximate to the reflector element 52 for generating the electromagnetic field.

In the illustrated embodiment, the conductive traces 132 are formed on one or more layers of the multi-layer printed circuit board 140 to form electromagnetic coils extending in a desired direction. As used herein, a "conductive trace" may include either a trace formed on a single layer of the board 140 or a continuous conductive path extending to a plurality of layers of the board 140 or sides of a single layer of the board 140. For example, the conductive traces 132 may extend about each side of a single layer of the multi-layer printed circuit board 140 or may extend to a plurality of layers of the multi-layer printed circuit board 140 to form a conductive coil. In the illustrated embodiment, the conductive coils comprise a relatively continuous trace 132 extending spirally and longitudinally along the board 140 in a desired direction; however, it should be understood that the electromagnetic coil may also be formed using a plurality of discrete traces 132 disposed adjacent each other and extending in a desired direction along the board 140 about either a single layer or multiple layers of the board 140. For example, a plurality of discrete traces 132 may be formed spaced apart from each other on the board 140. Each of the traces 132 in the above-described example may extend about a single layer or multiple layers of the board 140 to form a plurality of discrete "coil segments" such that each "coil segment" comprises a conductive path forming an almost complete flattened circular path about the layer or layers. Thus, together, the plurality of discrete traces 132 form a conductive coil extending in a desired direction along the board 140.

As illustrated in FIG. 6, a coil 160 may be formed extending substantially along the X-axis 32 by forming the conductive traces 132 extending substantially along the Y-axis 44 and extending from layer 146 to layer 152. A coil 162 may be formed extending substantially along the Y-axis 44 by forming the conductive traces 132 extending substantially along the X-axis 32 and extending from layer 148 to layer 150. Because layers 148 and 150 are disposed between the layers 146 and 152, the coil 162 is disposed between the layers 146 and 152 and essentially within the coil 160. However, it should be understood that the routing of the conductive traces 132 between the various layers of the multi-layer printed circuit board 140 may be otherwise modified. The layers 142 and 144 may be used to form additional conductive traces 132 or may be used to provide board 140 symmetry. The layers 140 and 142 may also provide a location for additional signal circuitry and electronic component attachment to the multi-layer printed circuit board 140.

To further illustrate the formation of the coil 160 of FIG. 6, a conductive trace 170 may be formed on the layer 152 and extend to a conductive trace 172 formed on the layer 146 through vias 174, 176, 178, and 180 formed in each of the respective layers 152, 150, 148, and 146. The conductive trace 172 may then extend upwardly through vias 182, 184, 186, and 188 formed in each of the respective layers 146, 148, 150, and 152 to a conductive trace 190 formed on the layer 152. The spiral formation of the conductive traces on the layers 146 and 152 may be repeated as previously described, thereby forming the coil 160 extending substantially along the X-axis 32.

The coil 162 may be formed similarly to that described above for the coil 160. For example, a conductive trace 192 may be formed on the layer 150 extending substantially along the X-axis 32. The trace 192 extends to a trace 194 formed on the layer 148 through vias 196 and 198 formed in the respective layers 150 and 148. The trace 194 then extends upwardly from layer 148 to layer 150 to a conductive trace 200. The spiral formation of the conductive traces on the layers 148 and 150 may be repeated as previously described, thereby forming the coil 162 extending substantially along the Y-axis 44. Although the coils 160 and 162 as illustrated extend to only two different layers of the board 140, it should be understood that the coils 160 and 162 may also extend to greater than two layers of the board 140. Additionally, as will be described in greater detail below, multiple discrete coils, similar to the coils 160 and 162, may be formed extending across the length and width of the board 140, thereby providing greater electromagnetic field generating flexibility.

Figure 7:
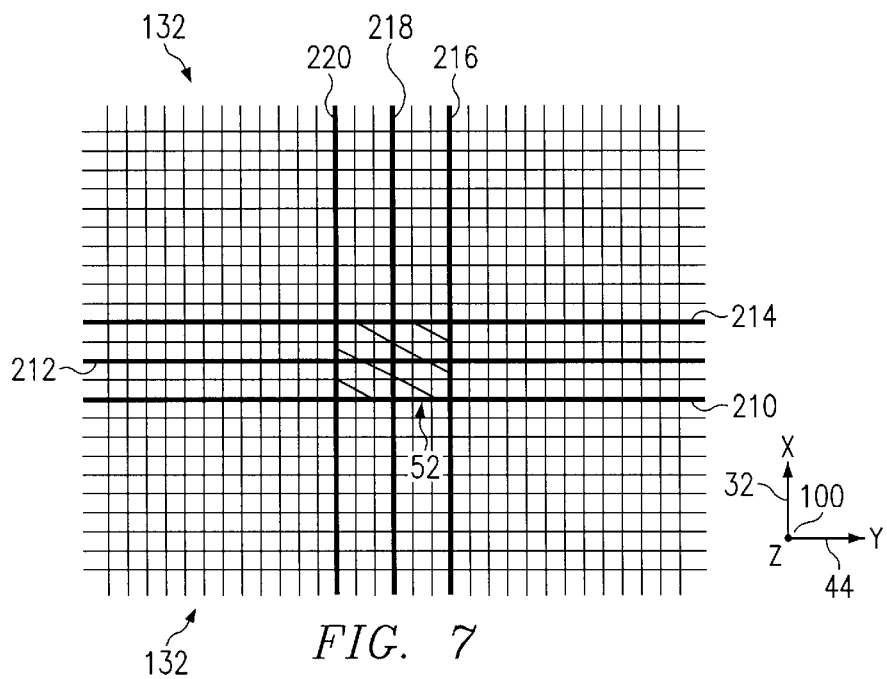
FIG. 7 is a diagram illustrating electromagnetic field generation of the system illustrated in FIGS. 4 and 5 in accordance with an embodiment of the present invention.

FIG. 7 is a diagram illustrating electromagnetic field generation of the system 10 illustrated in FIGS. 4–6 in accordance with an embodiment of the present invention. In FIG. 7, the conductive traces 132 are formed on the printed circuit board 130 relative to the reflector element 52. The substrate of the printed circuit board 130 has been omitted in FIG. 7 for clarity to better illustrate the interaction of forces between the magnetic field 110 and the electromagnetic field generated via the electromagnetic element 54.

Each conductive trace 132 illustrated in FIG. 7 may comprise a plurality of conductive traces spirally wound about the printed circuit board 130, either about a single layer or extending to multiple layers, thereby forming a plurality of discrete conductive coils extending along the X-axis 32 and the Y-axis 44. For example, a coil 210 may be formed extending along the X-axis 32 by spirally forming a plurality of conductive traces about the printed circuit board 130 in a direction substantially along the Y-axis 44. Coils 212 and 214 extending along the X-axis 32 may be formed similarly as described above for coil 210.

A coil 216 may be formed extending along the Y-axis 44 by spirally winding a plurality of conductive traces about the printed circuit board 130 in a direction corresponding to the X-axis 32. Coils 218 and 220 may be formed extending along the Y-axis 44 similarly as described above for the coil 216. Thus, each horizontal and vertical line illustrated in FIG. 7 represents a discrete electromagnetic coil extending along either the Y-axis 44 or the X-axis 32, respectively.

In operation, the controller 22 is coupled to each of the coils of the printed circuit board 130. The controller 22 selectively energizes and de-energizes each of the coils of the printed circuit board 130 to generate electromagnetic forces that interact with the forces associated with the magnetic field 110 to provide movement of the reflector element 52 relative to the data storage medium 14. The controller 22 may also control an amplitude and direction of the current generated in each of the coils to provide for the desired movement of the reflector element 52 relative to the data storage medium 14. For example, generating a current through the coil 218 generates electromagnetic forces that interact with the forces generated by the magnetic field 110 resulting in forces acting on the reflector element 52 along the Y-axis 44. Generating a current through the coil 212 generates electromagnetic forces that interact with the forces associated with the magnetic field 110 resulting in forces acting on the reflector element 52 along the X-axis 32. Energizing coils 216 and 220, as well as coils 210 and 214, generates electromagnetic forces that interact with the forces associated with the magnetic field 110 resulting in forces acting on the reflector element 52 along the Z-axis 100, as well as providing rotational movement of the reflector element 52 about the X-axis 32 and the Y-axis 44.

Thus, the present invention generates an electromagnetic field to control and direct the optical signal 24 relative to the data storage medium 14 for reading, writing, or erasing data associated with the data storage medium 14. Accordingly, the present invention substantially reduces the quantity of motors and actuators required by prior drive systems, thereby substantially reducing the cost of the drive system and the potential for mechanical failure. Although the embodiments described above illustrate the electromagnetic element 54 functioning as an electromagnetic stator and the reflector element 52 functioning as a rotor relative to a stationary storage medium 14, it should be understood that the interactive magnetic and electromagnetic forces may be otherwise generated or located relative to each other to provide movement of the respective elements relative to each other. For example, the electromagnetic and magnetic fields may be reversed between the elements 52 and 54 by, for example, providing electromagnetic coils coupled to the element 52 and magnets coupled to the element 54.

What is claimed is:

1. An electromagnetically controlled drive system for accessing a data storage medium, comprising:
    an optical signal generator;
    a reflector element adapted to receive an optical signal from the optical signal generator and direct the optical signal toward the data storage medium; and
    an electromagnetic element adapted to generate an electromagnetic field proximate to the reflector element, the reflector element adapted to respond to the electromagnetic field to move the optical signal relative to the data storage medium in response to a change in the electromagnetic field, wherein the electromagnetic element comprises at least a multi-layer printed circuit board with conductive traces formed on at least one layer of the printed circuit board.

2. The system of claim 1, further comprising a controller coupled to the electromagnetic element and adapted to selectively alter the electromagnetic field to move the reflector element relative to the optical signal generator.

3. The system of claim 1, further comprising a support system configured to movably suspend the reflector element relative to the data storage medium.

4. The system of claim 1, wherein the conductive traces form an electromagnetic coil.

5. The system of claim 1, wherein the conductive traces extend to at least two layers of the multi-layer printed circuit board.

6. The system of claim 1, wherein the conductive traces comprise a plurality of discrete, spaced apart traces forming a conductive coil segment.

7. The system of claim 1, wherein the conductive traces extend in at least two different axial directions.

8. The system of claim 1, wherein the conductive traces form a plurality of conductive coils, each conductive coil extending in a different direction.

9. A method for accessing a data storage medium, comprising:

directing an optical signal toward the data storage medium via a reflector element; and generating an electromagnetic field proximate to the reflector element, the reflector element adapted to respond to the electromagnetic field to move the optical signal relative to the data storage medium in response to a change in the electromagnetic field, wherein generating the electromagnetic field comprises selectively generating a current through at least one of a plurality of conductive traces formed on a printed circuit board.

10. The method of claim 9, wherein generating the electromagnetic field comprises selectively generating a current through at least one conductive coil formed by the conductive traces.

11. The method of claim 9, wherein generating the electromagnetic field comprises selectively generating a current through at least one of a plurality of conductive traces formed on a multi-layer printed circuit board.

12. The method of claim 9, wherein generating the electromagnetic field comprises selectively generating a current through a plurality of conductive coils each extending in a different axial direction, the conductive coils formed by the conductive traces.

13. The method of claim 9, wherein generating the electromagnetic field comprises selectively generating a current through a plurality of discrete, spaced apart conductive traces, the spaced apart conductive traces forming a conductive coil segment.

14. An electromagnetically-controlled drive system for accessing a data storage medium, comprising:

an optical signal generator;

a reflector element disposed in movable relation relative to the data storage medium and the optical signal generator, the reflector element adapted to receive an optical signal from the optical signal generator and direct the optical signal toward the data storage medium; and an electromagnetic element configured to generate an electromagnetic field proximate to the reflector element, the reflector element adapted to move relative to the data storage medium and the optical signal generator in response to a change in the electromagnetic field, wherein the electromagnetic element comprises a plurality of conductive traces formed on a printed circuit board configured to generate the electromagnetic field.

15. The system of claim 14, wherein the conductive traces form an electromagnetic coil.

16. The system of claim 14, wherein the conductive traces extend in at least two different axial directions.

17. The system of claim 14, wherein the conductive traces comprise a plurality of discrete, spaced apart traces forming a conductive coil segment.

18. The system of claim 14, wherein the conductive traces extend to at least two sides of the printed circuit board to form a conductive coil.

19. The system of claim 14, wherein the conductive traces form a plurality of conductive coils each extending in a different axial direction.

20. The system of claim 14, further comprising a controller coupled to the electromagnetic element and adapted to control a direction of an electric current generated through the conductive traces to move the reflector element in a desired direction relative to the data storage medium.

* * * * *